United States Patent
Hou et al.

(10) Patent No.: US 10,624,123 B2
(45) Date of Patent: Apr. 14, 2020

(54) PRACH ACCESS CONTROL METHOD, AND ACCESS METHOD AND DEVICE

(71) Applicant: ZTE CORPORATION, Shenzhen, Guangdong (CN)

(72) Inventors: Xiaohui Hou, Guangdong (CN); Feng Yang, Guangdong (CN); Xinglin Yao, Guangdong (CN); Yanmei Li, Guangdong (CN); Yanpeng Wang, Guangdong (CN)

(73) Assignee: ZTE Corporation, Shenzhen, Guangdong (CN)

( * ) Notice: Subject to any disclaimer, the term of this patent is extended or adjusted under 35 U.S.C. 154(b) by 177 days.

(21) Appl. No.: 15/580,639

(22) PCT Filed: Sep. 15, 2015

(86) PCT No.: PCT/CN2015/089648
§ 371 (c)(1),
(2) Date: Dec. 7, 2017

(87) PCT Pub. No.: WO2016/197474
PCT Pub. Date: Dec. 15, 2016

(65) Prior Publication Data
US 2018/0184448 A1    Jun. 28, 2018

(30) Foreign Application Priority Data
Jun. 10, 2015    (CN) .......................... 2015 1 0315942

(51) Int. Cl.
*H04W 74/00*    (2009.01)
*H04W 74/08*    (2009.01)
*H04L 5/00*    (2006.01)

(52) U.S. Cl.
CPC ......... *H04W 74/008* (2013.01); *H04L 5/0053* (2013.01); *H04W 74/08* (2013.01); *H04W 74/0841* (2013.01)

(58) Field of Classification Search
CPC ........... H04W 74/008; H04W 74/0841; H04W 74/0833; H04L 5/0053
See application file for complete search history.

(56) References Cited

U.S. PATENT DOCUMENTS

| 8,793,743 B2 | 7/2014 | Oyman |
| 8,817,734 B2 | 8/2014 | Khoryaev et al. |

(Continued)

FOREIGN PATENT DOCUMENTS

| CN | 101808329 A | 8/2010 |
| CN | 101873619 A | 10/2010 |

(Continued)

OTHER PUBLICATIONS

International Search Report dated Mar. 18, 2016 for International Application No. PCT/CN2015/089648, 11 pages.

(Continued)

*Primary Examiner* — Omer S Mian
(74) *Attorney, Agent, or Firm* — Knobbe Martens Olson & Bear LLP

(57) ABSTRACT

Provided are a PRACH access control method, access method and device. The PRACH access control method includes: receiving a PRACH preamble serial number transmitted by a terminal in each subframe of a virtual access frame; obtaining a PRACH access serial number of the terminal based on the received PRACH preamble serial number according to a mapping, which is predetermined with the terminal, between PRACH preamble serial numbers and PRACH access serial numbers; and transmitting the obtained PRACH access serial number to the terminal.

8 Claims, 3 Drawing Sheets

(56) References Cited

U.S. PATENT DOCUMENTS

| | | | |
|---|---|---|---|
| 8,923,323 B2 | 12/2014 | Heo et al. | |
| 8,989,118 B2 | 3/2015 | He et al. | |
| 9,155,082 B2 | 10/2015 | Davydov et al. | |
| 9,215,701 B2 | 12/2015 | Koc et al. | |
| 2008/0139214 A1* | 6/2008 | Sun | H04W 72/042 455/450 |
| 2010/0182974 A1 | 7/2010 | Barraclough et al. | |
| 2011/0013542 A1 | 1/2011 | Bin et al. | |
| 2011/0058572 A1* | 3/2011 | Du | H04W 74/006 370/458 |
| 2013/0242720 A1 | 9/2013 | Chou | |
| 2013/0242726 A1 | 9/2013 | Zhu et al. | |
| 2013/0242735 A1 | 9/2013 | Koc et al. | |
| 2013/0242770 A1 | 9/2013 | Chen et al. | |
| 2013/0242812 A1 | 9/2013 | Khoryaev et al. | |
| 2013/0242817 A1 | 9/2013 | He et al. | |
| 2013/0242818 A1 | 9/2013 | Heo et al. | |
| 2013/0242819 A1 | 9/2013 | He et al. | |
| 2013/0242831 A1 | 9/2013 | Vannithamby et al. | |
| 2013/0242832 A1 | 9/2013 | Koc et al. | |
| 2013/0242885 A1 | 9/2013 | Zhu et al. | |
| 2013/0242886 A1 | 9/2013 | Chen et al. | |
| 2013/0242887 A1 | 9/2013 | Zhu et al. | |
| 2013/0242889 A1 | 9/2013 | Kyoryaev et al. | |
| 2013/0242890 A1 | 9/2013 | He et al. | |
| 2013/0242947 A1 | 9/2013 | Chen et al. | |
| 2013/0244656 A1 | 9/2013 | Heo et al. | |
| 2013/0265928 A1 | 10/2013 | Martinez Tarradell et al. | |
| 2014/0003400 A1* | 1/2014 | Lim | H04L 1/1861 370/336 |
| 2014/0056200 A1 | 2/2014 | Koc et al. | |
| 2014/0140278 A1 | 5/2014 | Chou | |
| 2014/0254504 A1 | 9/2014 | Bashar et al. | |
| 2014/0307596 A1 | 10/2014 | He et al. | |
| 2014/0376440 A1 | 12/2014 | Oyman | |
| 2015/0063104 A1 | 3/2015 | Zhu et al. | |
| 2015/0341950 A1* | 11/2015 | Pang | H04W 72/1263 370/329 |
| 2016/0323915 A1* | 11/2016 | Liu | H04W 74/0825 |
| 2017/0202031 A1* | 7/2017 | Pang | H04L 5/0055 |

FOREIGN PATENT DOCUMENTS

| | | |
|---|---|---|
| CN | 104350798 A | 2/2015 |
| WO | 2009/016260 A1 | 2/2009 |
| WO | 2014206311 A1 | 12/2014 |

OTHER PUBLICATIONS

Written Opinion of the International Searching Authority dated Mar. 18, 2016, 2016 for International Application No. PCT/CN2015/089648, 3 pages.

Extended European Search Report of corresponding Patent Application No. 15894742.4—11 pages (dated Nov. 26, 2018).

Panasonic, "PRACH configuration for frame structure type 1", 3GPP TSG-RAN1 Meeting #53bis, R1-082661—8 pages (Jul. 6, 2008).

3rd Generation Partnership Project; Technical Specification Group Radio Access Network; Evolved Universal Terrestrial Radio Access (E-UTRA); Medium Access Control (MAC) protocol specification (Release 11), 3GPP TS 36.321, V11.6.0—57 pages (Mar. 2015).

* cited by examiner

PRACH ACCESS CONTROL METHOD, AND ACCESS METHOD AND DEVICE

CROSS REFERENCE TO RELATED APPLICATIONS

This application is the U.S. National Phase Application under 35 U.S.C. § 371 of International Application No. PCT/CN2015/089648 filed on Sep. 15, 2015, designating the U.S. and published as WO 2016/197474 A1 on Dec. 15, 2016 which claims the benefit of Chinese Patent Application No. 201510315942.3, filed Jun. 10, 2015, both of which are hereby incorporated by reference in their entirety.

TECHNICAL FIELD

The present application relates to, but is not limited to, the field of mobile communications.

BACKGROUND

With the development of the Long Term Evolution (LTE) system, the use of Machine Type Communication (MTC) has been gradually increased. Therefore, it is foreseeable that the number of user equipment (UEs) served by one base station will also be continuously increased in the future. In the related art, a Physical Random Access Channel (PRACH) access mechanism is as follows: a UE transmits PRACH preambles on a PRACH resource, which occupy time-frequency resources including one subframe in time domain and 6 resource blocks (RBs) in frequency domain. It can be seen in FIG. 1 that the PRACH access method in the related art provides a limited number of PRACH access serial numbers. As the number of UEs served by one base station increases hugely, access collisions are certain to increase, causing a great increase in a probability of multiple access retransmissions or even access failures.

SUMMARY

The following is a summary of a subject matter described herein in detail. This summary is not intended to limit the scope of the claims.

The present disclosure provides a PRACH access control method, access method and device to solve the problem where the existing Physical Random Access Channel (PRACH) access mechanism tends to cause PRACH access collisions to increase when one base station is responsible for large data of terminals.

According to a first aspect of embodiments of the present disclosure, a PRACH access control method is provided, which includes: receiving a PRACH preamble serial number transmitted by a terminal in each subframe of a virtual access frame; obtaining a PRACH access serial number of the terminal based on the received PRACH preamble serial number according to a mapping, which is predetermined with the terminal, between PRACH preamble serial numbers and PRACH access serial numbers; and transmitting the obtained PRACH access serial number to the terminal.

Optionally, the method further includes: before receiving the PRACH preamble serial number transmitted by the terminal in each subframe of the virtual access frame, broadcasting PRACH resource information of a base station to the terminal, where the PRACH resource information includes the number of subframes contained in the virtual access frame, and one virtual access frame is defined as a unit in which PRACH access is initiated at a time.

Optionally, obtaining the PRACH access serial number of the terminal based on the received PRACH preamble serial number according to the mapping, which is predetermined with the terminal, between PRACH preamble serial numbers and PRACH access serial numbers includes: calculating the PRACH access serial number of the terminal using a predetermined algorithm based on the received PRACH preamble serial number, the number of subframes of the virtual access frame, and the number of elements in a PRACH preamble serial number set.

Optionally, obtaining the PRACH access serial number of the terminal based on the received PRACH preamble serial number according to the mapping, which is predetermined with the terminal, between PRACH preamble serial numbers and PRACH access serial numbers includes: calculating the PRACH access serial number of the terminal using a formula, where the formula is $R=R_0+R_1M+ \ldots +R_{N-1}M^{N-1}$, where the PRACH access serial number is R, the number of subframes of the virtual access frame is N, the number of elements in the PRACH preamble serial number set is M, and the PRACH preamble serial numbers transmitted by the terminal are $R_0, R_1, \ldots, R_{N-1}$ respectively.

According to a second aspect of embodiments of the present disclosure, a PRACH access method is provided, which includes: receiving a system message transmitted by a base station, and transmitting a PRACH preamble serial number to the base station in each subframe of a virtual access frame defined in the system message; and receiving a PRACH access serial number fed back by the base station.

According to a third aspect of embodiments of the present disclosure, a PRACH access control device is provided, which includes: a first receiving module, which is configured to receive a PRACH preamble serial number transmitted by a terminal in each subframe of a virtual access frame; a determining module, which is configured to obtain a PRACH access serial number of the terminal based on the received PRACH preamble serial number according to a mapping, which is predetermined with the terminal, between PRACH preamble serial numbers and PRACH access serial numbers; and a first transmitting module, which is configured to transmit the obtained PRACH access serial number to the terminal.

Optionally, the device further includes: a broadcasting module, which is configured, before receiving the PRACH preamble serial number transmitted by the terminal in each subframe of the virtual access frame, to broadcast PRACH resource information of a base station to the terminal, where the PRACH resource information includes the number of subframes contained in the virtual access frame, and one virtual access frame is defined as a unit in which PRACH access is initiated at a time.

Optionally, the determining module is configured to calculate the PRACH access serial number of the terminal using a predetermined algorithm based on the received PRACH preamble serial number, the number of subframes of the virtual access frame, and the number of elements in a PRACH preamble serial number set.

Optionally, the determining module is configured to calculate the PRACH access serial number of the terminal using a formula, where the formula is $R=R_0+R_1M+ \ldots +R_{N-1}M^{N-1}$, where the PRACH access serial number is R, the number of subframes of the virtual access frame is N, the number of elements in the PRACH preamble serial number set is M, and the PRACH preamble serial numbers transmitted by the terminal are $R_0, R_1, \ldots, R_{N-1}$ respectively.

According to a fourth aspect of embodiments of the present disclosure, a PRACH access device is provided, which includes: a second transmitting module, which is configured to receive a system message transmitted by a base station, and to transmit a PRACH preamble serial number to the base station in each subframe of a virtual access frame defined in the system message; and a second receiving module, which is configured to receive a PRACH access serial number fed back by the base station.

According to a fifth aspect of embodiments of the present disclosure, a computer-readable storage medium is provided, which is configured to store computer-executable instructions for executing any method described above.

In the solution provided by embodiments of the present disclosure, the terminal transmits a PRACH preamble serial number in each subframe of the virtual access frame, and the PRACH access serial number corresponding to the preamble serial number is obtained according to the predetermined mapping. This increases the number of provided PRACH access serial numbers, reduces the PRACH access collision probability of the terminal and increases the allowed number of access terminals.

Other aspects can be understood after the accompanying drawings and detailed description are read and understood.

DETAILED DESCRIPTION

To solve the problem in the related art where the existing Physical Random Access Channel (PRACH) access mechanism tends to cause PRACH access collisions to increase when one base station is responsible for large data of terminals, the present disclosure provides a PRACH access control method, access method and device. Embodiments of the present disclosure will be described below in conjunction with the accompanying drawings.

Embodiment 1

Figure 1:
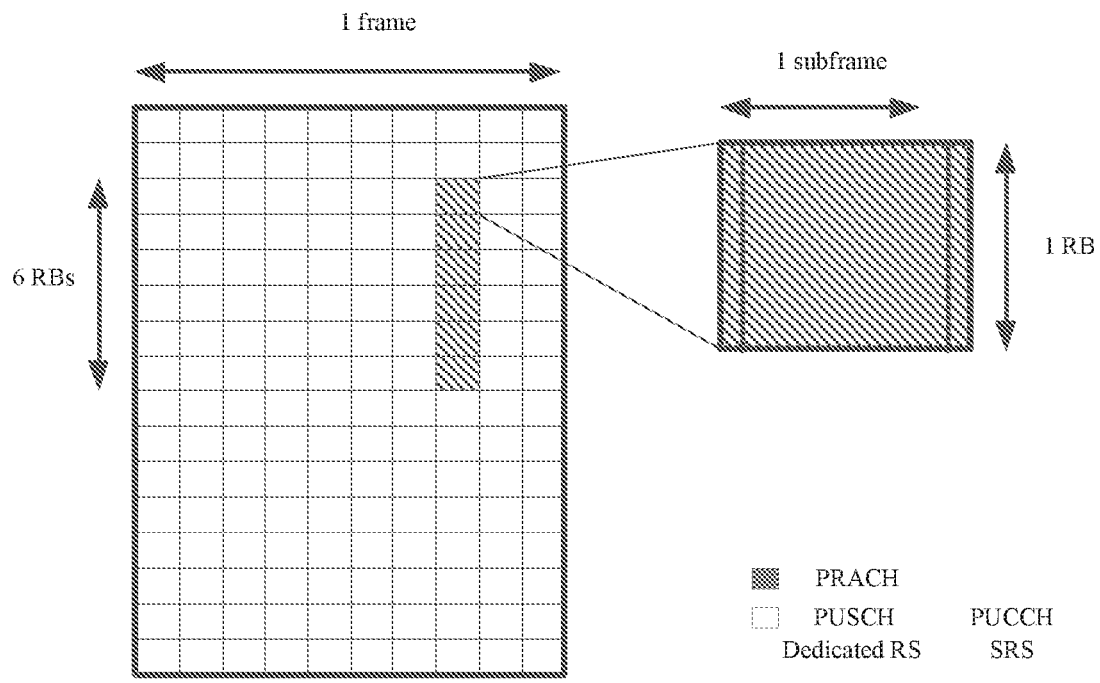
FIG. 1 is a schematic diagram of a PRACH resource in the related art.
Figure 2:
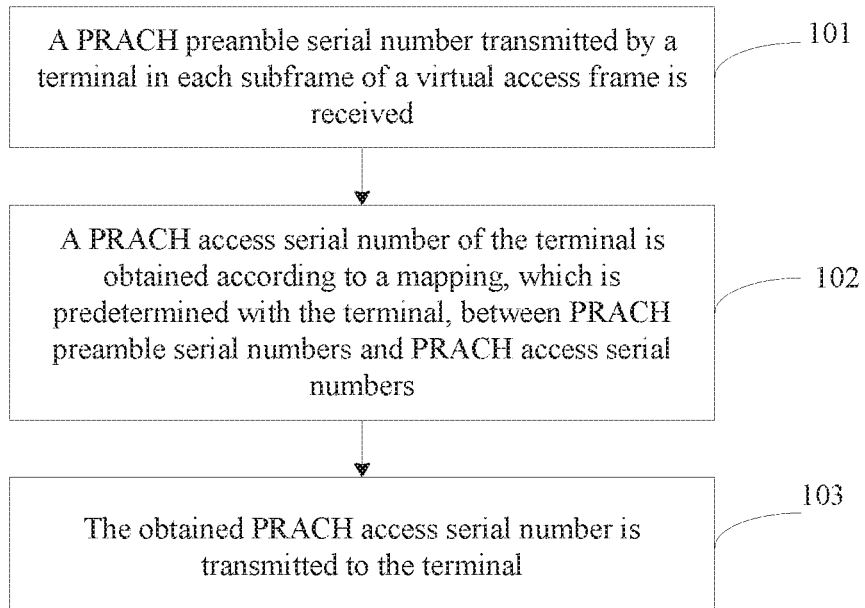
FIG. 2 is a flowchart of a PRACH access control method according to embodiment 1 of the present disclosure.

The present embodiment provides a PRACH access control method. The method may be implemented by a base station or a device disposed on the base station. FIG. 2 is a flowchart of the PRACH access control method. As illustrated in FIG. 2, the method includes steps described below.

In step 101, a PRACH preamble serial number transmitted by a terminal in each subframe of a virtual access frame is received.

Before the PRACH preamble serial number transmitted by the terminal in each subframe of the virtual access frame is received, PRACH resource information of the base station is broadcasted to the terminal. The PRACH resource information includes the number of subframes contained in the virtual access frame. One virtual access frame is defined as a unit in which PRACH access is initiated at a time. That is, each time the terminal initiates PRACH access to the base station, the terminal transmits a different PRACH preamble serial number in each subframe of the virtual access frame.

In step 102, a PRACH access serial number of the terminal is obtained according to a mapping, which is predetermined with the terminal, between PRACH preamble serial numbers and PRACH access serial numbers.

In the step 102, the PRACH access serial number of the terminal may be calculated using a predetermined algorithm based on the received PRACH preamble serial number, the number of subframes of the virtual access frame, and the number of elements in a PRACH preamble serial number set. The following example illustrates how to obtain the PRACH access serial number.

The number of subframes of the virtual access frame is N, the number of elements in the PRACH preamble serial number set is M, and the PRACH preamble serial numbers transmitted by the terminal are $R_0, R_1, \ldots, R_{N-1}$ respectively, thus the formula used for calculating the corresponding PRACH access serial number R is $R=R_0+R_1 M+\ldots+R_{N-1}M^{N-1}$. The PRACH access serial number of the terminal is calculated using the formula.

In step 103, the obtained PRACH access serial number is transmitted to the terminal.

Figure 3:
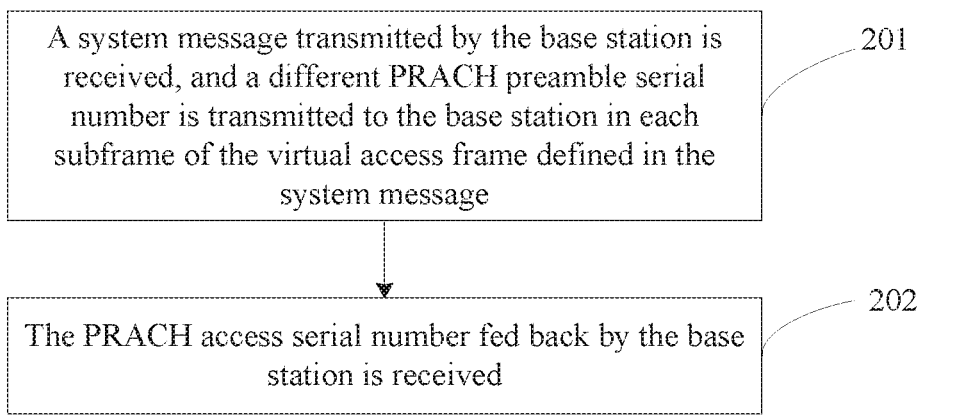
FIG. 3 is a flowchart of a PRACH access method according to embodiment 1 of the present disclosure.

The present embodiment further provides a PRACH access method. The PRACH access method is implemented on the terminal. As illustrated in FIG. 3, the PRACH access method may include steps described below.

In step 201, a system message transmitted by the base station is received, and a different PRACH preamble serial number is transmitted to the base station in each subframe of the virtual access frame defined in the system message.

In step 202, the PRACH access serial number fed back by the base station is received.

Figure 4:
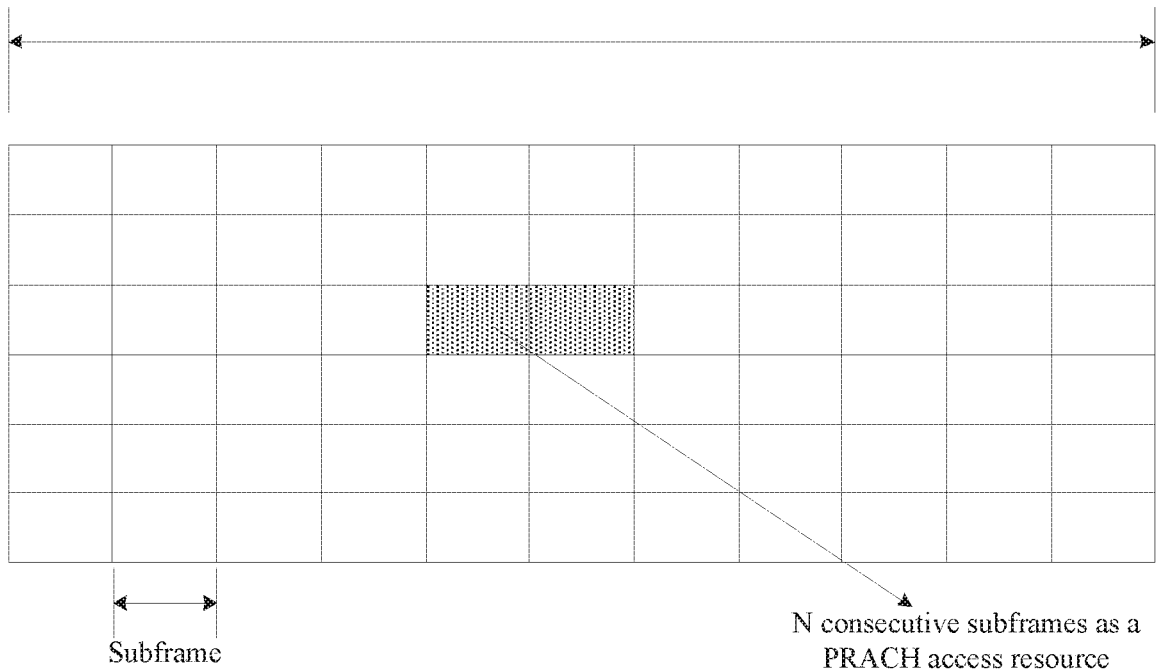
FIG. 4 is a schematic diagram of a PRACH resource according to embodiment 1 of the present disclosure.

To reduce the probability of PRACH access collisions of the terminal, in Frequency Division Duplexing (FDD) LTE, PRACH preambles are transmitted in N successive uplink subframes at a time. The N successive uplink subframes serve as one virtual frame for PRACH access (referred to as virtual access frame). See FIG. 4. The virtual frame is the basic unit of PRACH access. In TDD LTE, the unit of a virtual subframe is also N consecutive uplink subframes. When the preamble serial numbers are transmitted through the virtual frame, the UE is required to transmit a PRACH preamble serial number in each subframe. The preamble serial number selectable in each subframe may be an existing LTE preamble serial number, thus minimizing processing of a bottom layer by the UE and the eNodeB and minimizing impacts on protocols.

In the present embodiment, assuming that the number of elements in the PRACH preamble serial number set is M in LTE, when one subframe is used for PRACH access and only two UEs are available, the collision probability of the two UEs is $p_c=1/M^2$.

When N subframes are used for PRACH access and only two UEs are available, the collision probability of the two UEs is $p_c=1/(M^N)^2$.

It can be seen that as N increases, the collision probability becomes smaller gradually, but the larger the value of N is, the longer the delay of access becomes.

When the virtual access frame is used for PRACH access, the UE is required to transmit a preamble serial number in each subframe. In one PRACH virtual access frame, the subframes are numbered $0, 1, \ldots, N-1$ frames by time.

Since the UE initiates access in the virtual frame, after N preamble serial numbers are transmitted in the virtual frame, the eNodeB needs to reply preamble serial numbers to the UE for delivery of a random access response. This value is used to solve random access collisions of the UE. The UE and the eNodeB need to make an agreement on the mapping between subframe preamble serial numbers and virtual frame access serial numbers, just as the method illustrated in the above example. However, the above method is just one mapping scheme, and any other rule that can implement a one-to-one mapping between preamble serial numbers and virtual access serial numbers is applicable. The PRACH serial numbers are used when the base station makes the random access response.

Embodiment 2

The present embodiment uses 64 preambles in the FDD LTE system as an example to describe in detail a PRACH access method according to the embodiment of the present disclosure.

A base station broadcasts PRACH resource information of the base station in SIB2. A description of N is added to the SIB2. A parameter N is added to PRACH-ConfigInfo to describe the number of subframes contained in a virtual access frame. Meanwhile, any PRACH resource that is originally described in units of subframes starts to be described in units of virtual frames.

A UE receives a system message to obtain a PRACH configuration of the base station.

Based on the obtained configuration, the UE randomly transmits preamble serial numbers in a virtual frame, i.e., transmits a different preamble serial number in each subframe of the virtual frame. In particular, the method for transmitting preambles in subframes may be consistent with the existing PRACH preamble transmission method and may be implemented in steps described below.

In step 1, a code resource is selected.

When an RRC is configured with a specified resource (ra-PreambleIndex is not all 0), this specified resource is selected. The parameter ra-PreambleIndex is a code index and the parameter ra-PRACH-MaskIndex is a time-frequency location.

If the RRC is not configured with the specified resource and MSG3 has not been transmitted and if a group B exists and the MSG3 that needs to be transmitted is greater than messageSizeGroupA, then it is determined whether power required by the group B is satisfied. If the power is satisfied, a code of the group B is randomly selected and transmitted. The determination condition is PCMAX-preambleInitialReceivedTargetPower-deltaPreambleMsg3-messagePowerOffsetGroupB. If the MSG3 has been transmitted, then the MSG3 is retransmitted. When a code group is selected, one of the group A and the group B is randomly selected, just as selected in the previous case.

In step 2, a time-frequency resource is selected.

The protocol allows a case where a code resource is specified and a time-frequency resource is not specified, but does not allow a case where a time-frequency resource is specified and a code resource is not specified.

A: In a case of noncompetitive access, PRACH Mask Index=ra-PreambleIndex; otherwise, PRACH Mask Index=0.

B: The time-frequency resource is selected with reference to parameters prach-ConfigIndex, PRACH Mask Index and ra-PreambleIndex.

If ra-PreambleIndexd (code resource) is specified but no time-frequency resource PRACH Mask Index is specified, one time-frequency resource is randomly selected.

If the code resource is not specified, one time-frequency resource is randomly selected and then two resources are selected after two consecutive frames after this time-frequency resource. Finally, one resource is selected equally from the three resources.

The base station processes enhanced PRACH access of the UE using a virtual frame resource that has been predetermined with the UE, and calculates a PRACH access number for the enhanced PRACH access according to a predetermined mapping rule.

The base station delivers the obtained PRACH access number to the UE through an access response message, so as to solve collisions of the UE.

Embodiment 3

Figure 5:
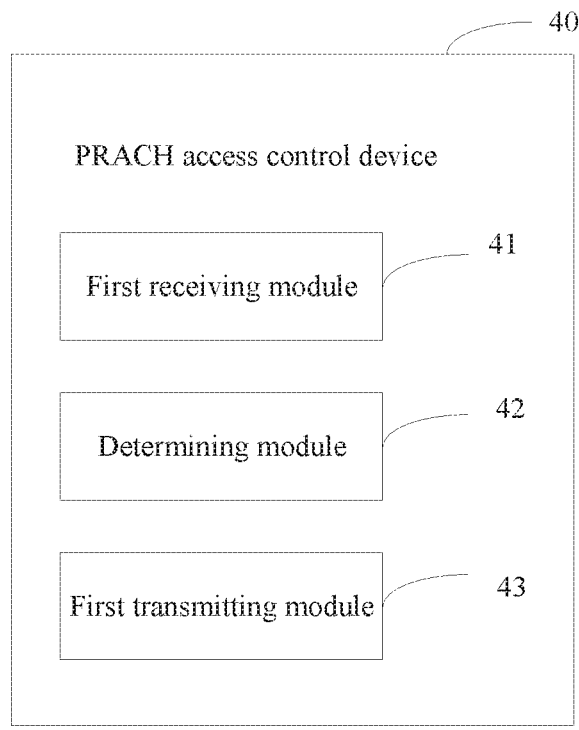
FIG. 5 is a block diagram of a PRACH access control device according to embodiment 3 of the present disclosure.

The present embodiment provides a PRACH access control device. The device is located on a base station and is configured to implement the PRACH access control method provided by the embodiment 1. FIG. 5 is a block diagram of the device. As illustrated in FIG. 5, the device 40 includes a first receiving module 41, a determining module 42 and a first transmitting module 43.

The first receiving module 41 is configured to receive a PRACH preamble serial number transmitted by a terminal in each subframe of a virtual access frame.

The determining module 42 is configured to obtain a PRACH access serial number of the terminal based on the received PRACH preamble serial number according to a mapping, which is predetermined with the terminal, between PRACH preamble serial numbers and PRACH access serial numbers.

The first transmitting module 43 is configured to transmit the obtained PRACH access serial number to the terminal.

The device further includes a broadcasting module, which is configured, before receiving the PRACH preamble serial number transmitted by the terminal in each subframe of the virtual access frame, to broadcast PRACH resource information of the base station to the terminal. The PRACH resource information includes the number of subframes contained in the virtual access frame. One virtual access frame is defined as a unit in which PRACH access is initiated at a time.

The determining module is configured to calculate the PRACH access serial number of the terminal using a predetermined algorithm based on the received PRACH preamble serial number, the number of subframes of the virtual access frame, and the number of elements in a PRACH preamble serial number set.

The determining module is configured to calculate the PRACH access serial number of the terminal using a formula, where the formula is $R=R_0+R_1M+ \ldots +R_{N-1}M^{N-1}$, where the PRACH access serial number is R, the number of subframes of the virtual access frame is N, the number of elements in the PRACH preamble serial number set is M, and the PRACH preamble serial numbers transmitted by the terminal are $R_0, R_1, \ldots, R_{N-1}$ respectively.

Figure 6:
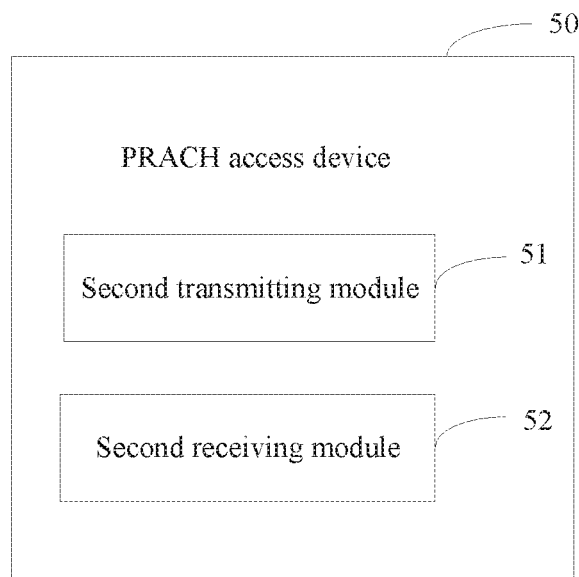
FIG. 6 is a block diagram of a PRACH access device according to embodiment 3 of the present disclosure.

As illustrated in FIG. 6, the present embodiment further provides a PRACH access device 50. The device 50 is located on the terminal and is configured to implement the PRACH access method provided by the embodiment 1. The device 50 may include a second transmitting module 51 and a second receiving module 52.

The second transmitting module 51 is configured to receive a system message transmitted by the base station, and to transmit a different PRACH preamble serial number to the base station in each subframe of the virtual access frame defined in the system message. The second receiving module 52 is configured to receive the PRACH access serial number fed back by the base station.

In the solution provided by embodiments of the present disclosure, the concept of a virtual access frame is introduced and the number of subframes of the virtual access frame is defined so that the terminal transmits a PRACH preamble serial number in each subframe of the virtual access frame, and the PRACH access serial number corresponding to the preamble serial number is obtained according to the predetermined mapping. The solution increases the number of provided PRACH access serial numbers, reduces the PRACH access collision probability of the terminal and increases the allowed number of access terminals.

It will be understood by those of ordinary skill in the art that all or part of the steps in the above-mentioned embodiments may be implemented using one or more computer programs. The computer programs may be stored in a computer readable storage medium and executed on a corresponding hardware platform (e.g., system, device, apparatus or component). During the execution of these programs, one of or a combination of the steps in the above-mentioned method embodiments is implemented.

Optionally, all or part of the steps in the above-mentioned embodiments may also be implemented using one or more integrated circuits. These steps may be made into integrated circuit modules separately, or part of these modules or steps may be made into a single integrated circuit module for implementation.

The various devices/function modules/function units in the above-mentioned embodiments may be implemented on a general-purpose computing device. They may be concentrated on a single computing device or distributed over a network composed of multiple computing devices.

The various devices/function modules/function units in the above-mentioned embodiments are implemented by software function modules, and can be stored in a computer-readable storage medium when sold or used as stand-alone products. The above-mentioned computer-readable storage medium may be a read-only memory, a magnetic disk or an optical disk, etc.

INDUSTRIAL APPLICABILITY

In the solution provided by embodiments of the present disclosure, the terminal transmits a PRACH preamble serial number in each subframe of the virtual access frame, and the PRACH access serial number corresponding to the preamble serial number is obtained according to the predetermined mapping. The solution increases the number of provided PRACH access serial numbers, reduces the PRACH access collision probability of the terminal and increases the allowed number of access terminals.

What is claimed is:

1. A PRACH access control method, comprising:
   receiving a Physical Random Access Channel (PRACH) preamble serial number transmitted by a terminal in each subframe of a virtual access frame;
   obtaining a PRACH access serial number of the terminal based on the received PRACH preamble serial number according to a mapping, which is predetermined with the terminal, between PRACH preamble serial numbers and PRACH access serial numbers; and
   transmitting the obtained PRACH access serial number to the terminal,
   wherein obtaining the PRACH access serial number of the terminal based on the received PRACH preamble serial number according to the mapping, which is predetermined with the terminal, between PRACH preamble serial numbers and PRACH access serial numbers comprises:
   calculating the PRACH access serial number of the terminal using a formula,
   wherein the formula includes $R=R_0+R_1M+ \ldots +R_{N-1}M^{N-1}$,
   wherein R includes the PRACH access serial number, N includes the number of subframes of the virtual access frame, M includes the number of elements in the PRACH preamble serial number set, and $R_0, R_1, \ldots, R_{N-1}$ include the PRACH preamble serial numbers transmitted by the terminal respectively.

2. The method of claim 1, further comprising:
   before receiving the PRACH preamble serial number transmitted by the terminal in each subframe of the virtual access frame, broadcasting PRACH resource information of a base station to the terminal, wherein the PRACH resource information includes a number of subframes included in the virtual access frame, and one virtual access frame is defined as a unit in which PRACH access is initiated at a time.

3. A PRACH access method, comprising:
   receiving a system message transmitted by a base station, and transmitting a PRACH preamble serial number to the base station in each subframe of a virtual access frame defined in the system message; and
   receiving a PRACH access serial number fed back by the base station;
   wherein the PRACH access serial number is calculated using a formula,
   wherein the formula includes $R=R_0+R_1M+ \ldots +R_{N-1}M^{N-1}$,
   wherein R includes the PRACH access serial number, N includes the number of subframes of the virtual access frame, M includes the number of elements in the PRACH preamble serial number set, and $R_0, R_1, \ldots, R_{N-1}$ include the PRACH preamble serial numbers respectively.

4. A PRACH access control device, comprising:
   a processor; and
   a memory for storing instructions executable by the processor,
   wherein the processor is configured to execute the method of claim 1.

5. The device of claim 4, wherein the processor is further configured:
   before receiving the PRACH preamble serial number transmitted by the terminal in each subframe of the virtual access frame, to broadcast PRACH resource information of a base station to the terminal, wherein the PRACH resource includes a number of subframes included in the virtual access frame, and one virtual access frame is defined as a unit in which PRACH access is initiated at a time.

6. A PRACH access device comprising:
   a processor; and
   a memory for storing instructions executable by the processor,
   wherein the processor is configured to execute the method of claim 3.

7. A non-transitory computer-readable storage medium storing computer-executable instructions that, when executed by a computer, cause the computer to perform the following method:

receiving a Physical Random Access Channel (PRACH) preamble serial number transmitted by a terminal in each subframe of a virtual access frame;

obtaining a PRACH access serial number of the terminal based on the received PRACH preamble serial number according to a mapping, which is predetermined with the terminal, between PRACH preamble serial numbers and PRACH access serial numbers; and transmitting the obtained PRACH access serial number to the terminal;

wherein obtaining the PRACH access serial number of the terminal based on the received PRACH preamble serial number according to the mapping, which is predetermined with the terminal, between PRACH preamble serial numbers and PRACH access serial numbers comprises:

calculating the PRACH access serial number of the terminal using a formula, wherein the formula includes $R=R_0+R_1M+ \ldots +R_{N-1}M^{N-1}$, wherein R includes the PRACH access serial number, N includes the number of subframes of the virtual access frame, M includes the number of elements in the PRACH preamble serial number set, and $R_0, R_1, \ldots, R_{N-1}$ include the PRACH preamble serial numbers transmitted by the terminal respectively.

8. The non-transitory computer-readable storage medium of claim 7, wherein the method further comprises:

before receiving the PRACH preamble serial number transmitted by the terminal in each subframe of the virtual access frame, broadcasting PRACH resource information of a base station to the terminal, wherein the PRACH resource information includes a number of subframes included in the virtual access frame, and one virtual access frame is defined as a unit in which PRACH access is initiated at a time.

* * * * *